(12) United States Patent
Foucher et al.

(10) Patent No.: US 7,614,846 B2
(45) Date of Patent: Nov. 10, 2009

(54) CERAMIC-BASED BUSHING FOR A VARIABLE-PITCH VANE SYSTEM IN A TURBOMACHINE

(75) Inventors: Christelle Foucher, Acigne (FR); Claude Robert Louis Lejars, Draveil (FR); Didier Riby, Boissise le Roi (FR)

(73) Assignee: Snecma, Paris (FR)

( * ) Notice: Subject to any disclaimer, the term of this patent is extended or adjusted under 35 U.S.C. 154(b) by 758 days.

(21) Appl. No.: 11/097,289

(22) Filed: Apr. 4, 2005

(65) Prior Publication Data

US 2005/0220609 A1 Oct. 6, 2005

(30) Foreign Application Priority Data

Apr. 5, 2004 (FR) ................................ 04 03536

(51) Int. Cl.
*F04D 29/04* (2006.01)
(52) U.S. Cl. ........................ 415/161; 415/229
(58) Field of Classification Search ......... 415/159–162, 415/229–230
See application file for complete search history.

(56) References Cited

U.S. PATENT DOCUMENTS

| 2,651,492 | A | * | 9/1953 | Feilden ............... 415/160 |
| 3,764,189 | A | | 10/1973 | Prostler et al. |
| 4,410,285 | A | | 10/1983 | Strasser et al. |
| 7,214,030 | B2 | * | 5/2007 | Arilla et al. ............... 415/160 |
| 2002/0154991 | A1 | | 10/2002 | Bowen |
| 2005/0008489 | A1 | * | 1/2005 | Perruchaut et al. .......... 416/160 |

FOREIGN PATENT DOCUMENTS

JP 58-163820 9/1983

OTHER PUBLICATIONS

Kalpakjian, Serope and Schmid, Steven R. Manufacturing Processes for Engineering Materials 4th Ed. Prentice Hall, 2003. p. 723. ISBN 0-13-040871-9.*

* cited by examiner

*Primary Examiner*—Ninh H Nguyen
*Assistant Examiner*—Aaron R Eastman
(74) *Attorney, Agent, or Firm*—Oblon, Spivak, McClelland, Maier & Neustadt, L.L.P.

(57) ABSTRACT

The invention relates to a ceramic-based bushing for mounting in a turbomachine casing to provide a smooth bearing for a pivot of a variable-pitch vane. The bushing is constituted by a metal jacket and a ceramic ring secured to the inside wall of said jacket by brazing. The invention also provides a turbomachine compressor having variable-pitch stator vanes with pivots mounted in the casing by means of such bushings.

5 Claims, 3 Drawing Sheets

CERAMIC-BASED BUSHING FOR A VARIABLE-PITCH VANE SYSTEM IN A TURBOMACHINE

The invention relates to a ceramic-based bushing for making a smooth bearing.

More particularly, the invention relates to a ceramic-based bushing for being mounted in a through orifice in a turbomachine casing in order to constitute a smooth bearing for the pivot of a variable-pitch vane.

BACKGROUND OF THE INVENTION

In a compressor of a turbomachine, and in particular of a turbojet, one or more sets of stator vanes may be of variable pitch, i.e. the angle of attack of such vanes can be varied as a function of flight conditions under the control of a servo-control system that moves a band connected via links to the pivots of the vanes in a given set, causing the band to turn and to move axially as a function of predefined parameters. Such variations in vane pitch, associated with vibration of the casing, leads to wear of contacting parts. It has been found that wear increases particularly when angular offsets are small and the frequency of vibration is in the vicinity of 160 hertz (Hz). The most harmful element is the peening pressure on the pivots, which is harmful to the strength of the parts.

For a variable-pitch system in a turbomachine, there is a special constraint constituted by the need to operate in a non-lubricated medium. Only dry lubrication can be envisaged for improving contact conditions and for increasing the lifetime of the parts.

To satisfy those needs, in French patent application No. FR 03/00435, filed on Jan. 16, 2003 and published on Jul. 23, 2004 under the No. FR 2 850 138, the Applicant proposes a smooth bearing comprising a ceramic bushing inside which there is placed a pivot based on iron, nickel, or cobalt, or a metal pivot carrying a shrunk-on insert based on iron, nickel, or cobalt, with the oxides of iron, nickel, or cobalt that are created during continuous contact between the vane pivot and the smooth bearing, acting as a lubricant.

One of the factors limiting the use of ceramics as material for making bushings is their brittleness and their low toughness. It thus happens that bushings break, either while being mounted on the casing, or else in operation because of the different coefficients of expansion between the metal of the casing and the ceramic and because of the shocks received by the systems.

OBJECTS AND SUMMARY OF THE INVENTION

The object of the invention is to propose a ceramic bushing that mitigates the above-mentioned drawbacks.

According to the invention, this object is achieved by the fact that the bushing is constituted by a metal jacket and a ceramic ring secured by brazing to the inside wall of said jacket.

The metal jacket strengthens the bushing while it is being mounted on the casing, thereby reducing breakage during that operation. In the event of any cracks being present in the ceramic ring, the pieces remain secured to the jacket by the brazing. In addition, the brazing acts as an interface between two materials having different expansion coefficients and serves to accommodate differences in expansion. Thus, the ceramic/metal bond is more flexible and the ceramic is stronger.

Advantageously, the jacket is cylindrical, and at one of its ends it presents a collar that extends radially outwards. This collar also presents on its outside face a ceramic washer secured by brazing.

The ceramic ring may be made as a single piece that is secured by brazing, or it may be made up of a plurality of pieces that are secured by brazing.

The invention also provides a compressor of a turbomachine having an outer casing and at least one set of variable-pitch stator vanes with pitch-control pivots passing through orifices formed through said casing and with ceramic-based bushings forming smooth bearings being interposed, in which the bushings are as described above.

When the pivot is made of steel or of titanium, it further carries an insert ring constituted of a metal material based on iron, nickel, or cobalt, and shrink-fitted onto the pivot.

BRIEF DESCRIPTION OF THE DRAWINGS

Other advantages and characteristics of the invention appear on reading the following description given by way of example and made with reference to the accompanying drawings, in which.

MORE DETAILED DESCRIPTION

Figure 1:
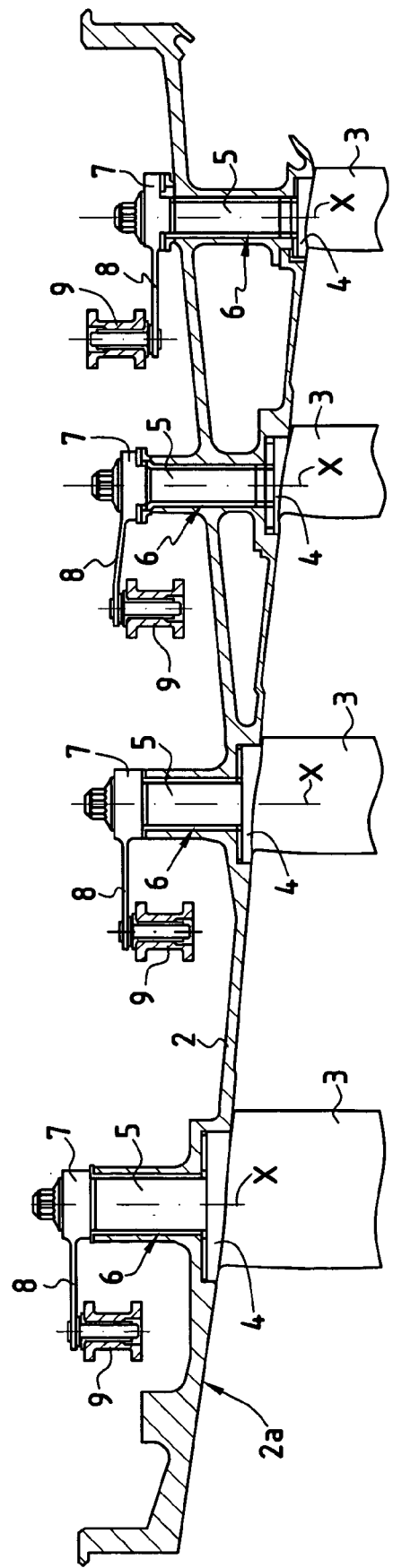
FIG. 1 is a half view in section of a high pressure compressor of a turbomachine having sets of stator vanes that are of variable pitch.

FIG. 1 shows a stator of a high pressure compressor of a turbomachine that has an outer casing 2 supporting a plurality of sets of stator vanes 3 that are of variable pitch.

The vanes 3 extend radially inside the casing 2 in the gas flow stream. In their radially outer regions each of them presents a plate 4 of circular outline that is received in a cavity formed in the inside face 2a of the casing 2, which plate is surmounted by a pivot 5 on the axis X of the plate 4 and received in a cylindrical orifice 6 passing through the casing 2. The head 7 of the pivot 5 carries a control arm 8 connected to a control band 9.

Each set of vanes is associated with a respective control band 9. Driving the control band causes all of the vanes 3 in a given set to pivot simultaneously.

Each pivot 5 is mounted in an orifice 6 with at least one bushing 10 being interposed to form a smooth bearing.

Figure 2:
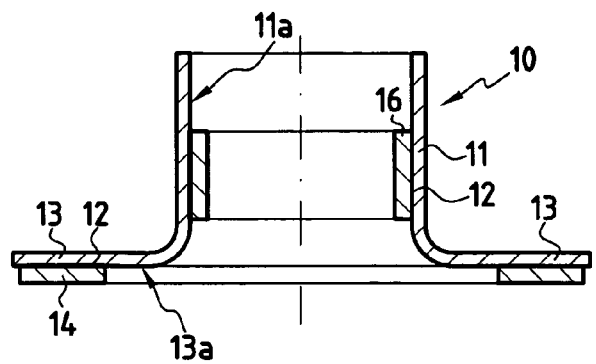
FIG. 2 is a section view on an axial plane through a bushing in accordance with the invention.

FIG. 2 shows a bushing 10 of the invention. The bushing 10 comprises a metal jacket 11 whose outside diameter is substantially equal to the diameter of the orifice 6, and a ceramic ring 16 secured to the inside wall 11a of the jacket 11 by brazing. Reference 12 represents the layer of brazing interposed between the outside face of the ceramic ring 16 and the inside wall 11a of the jacket 11.

By way of example, the ceramic of the ring 16 is made of alumina. The ring 16 is made by any known method. The diameter of the ring 16 is substantially equal to, and preferably slightly smaller than, the inside diameter of the jacket 11. The material constituting the brazing 12 is selected from materials or alloys having a melting temperature lower than the melting temperature of the material constituting the jacket 11, and that naturally wet both said jacket material and the ceramic. Said brazing material is also selected from materials that are very ductile and compress when cold and expand when hot so that the ceramic is not subjected to any traction or bending force in the event of temperature differences when the compressor is in operation or while the bushing 10 is being shrink-fitted to the casing 2 during mounting.

Since the layer of brazing 12 covers the entire outside surface of the ring 16, any crack that might appear in operation is no longer critical since all of the pieces are held by the brazing, and the various pieces of the ring 16 are held in position in the jacket 11 in the event of cracks. The ring 16 can be made up of a plurality of pieces that are secured to the inside wall 11a of the jacket 11 by brazing.

The bushing 10 advantageously presents a collar 13 that extends radially outwards. The face 13a of the collar has a ceramic washer 14 fitted thereto by brazing to provide dry friction against the end face of the plate 4.

Figure 3:
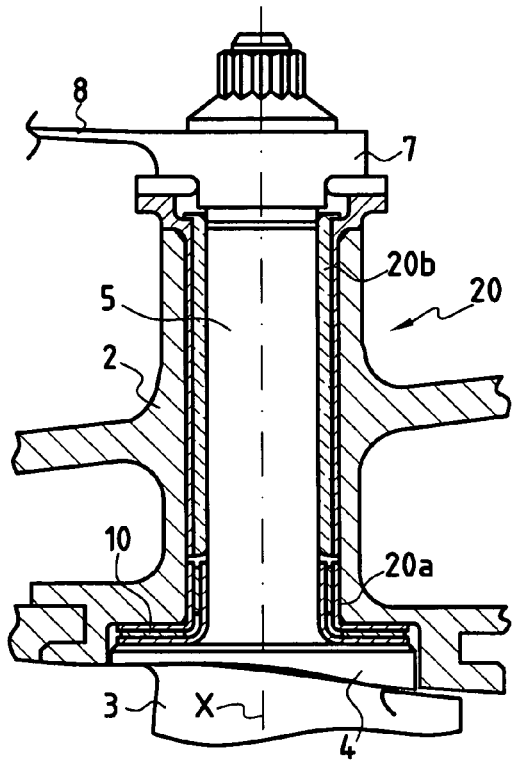
FIG. 3 shows a first variant embodiment of a smooth bearing.
Figure 4:
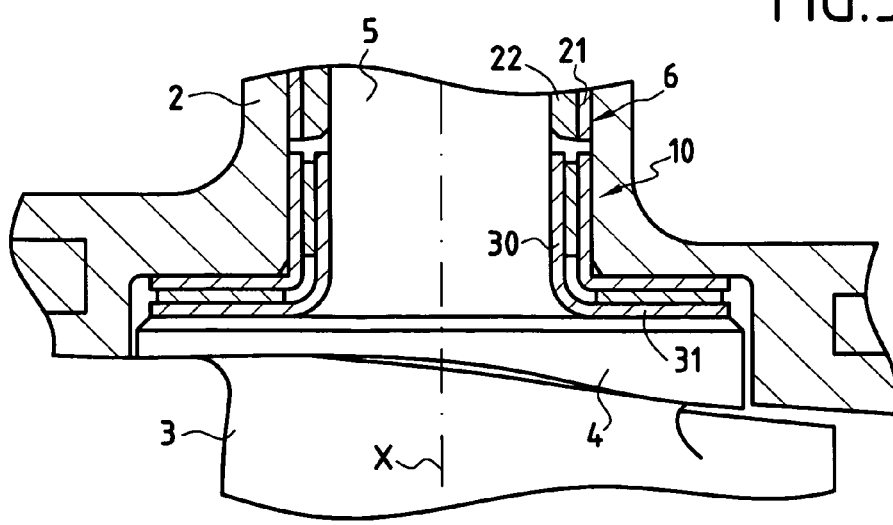
FIG. 4 is a view on a larger scale of the bottom bearing of the FIG. 3 variant.

FIGS. 3 and 4 show a first embodiment of a smooth bearing 20 for a pivot 5.

The bearing 20 comprises a bottom bearing 20a constituted by a bushing 10 as described above, and a top bearing 20b constituted by a jacket 21 surrounding a sleeve 22 made of a material having a coefficient of friction that is much lower than that of the ceramic, for example made of polyimide. The bushing 10 is situated close to the plate 4 on the vane 3 and corresponds to the more heavily-loaded bearing. This bushing can take up considerable amounts of force and serves to limit to a great extent the wear at the more heavily-loaded end of the pivot 5. The top bearing 20b limits the forces of the control arm 8 and of the actuators serving to actuate the control band 9.

Reference 30 designates an insert ring based on nickel, cobalt, or iron that is shrink-fitted on the pivot 5, in the event of the pivot not itself being constituted by an alloy having good friction characteristics. This insert ring 30 advantageously includes a collar 31 on the end face of the plate 4.

Figure 5:
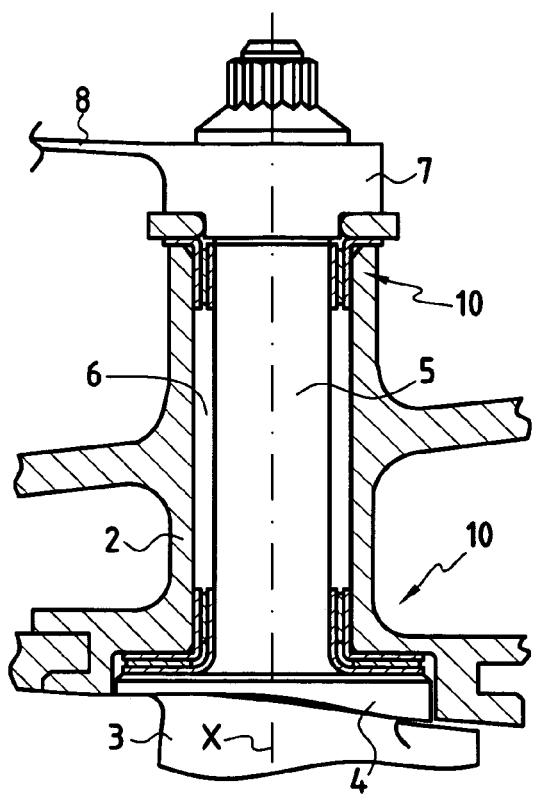
FIG. 5 shows a second variant embodiment of the invention.
Figure 6:
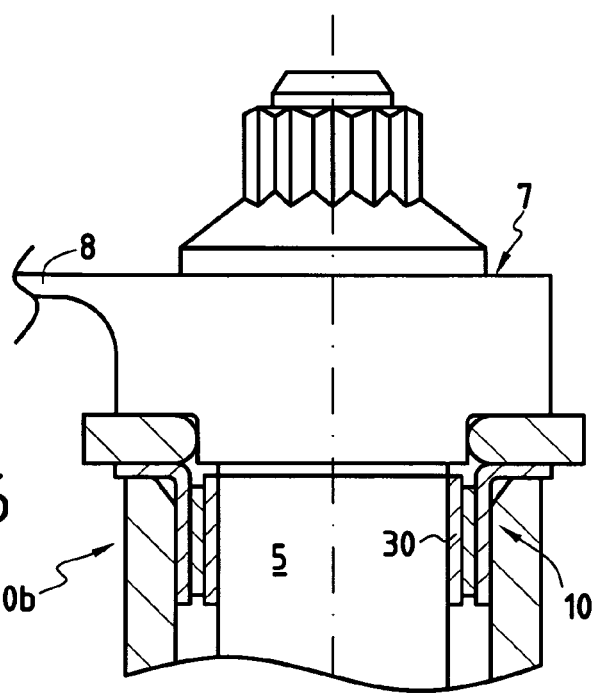
FIG. 6 is a view on a larger scale showing the top bearing of FIG. 5.
Figure 7:
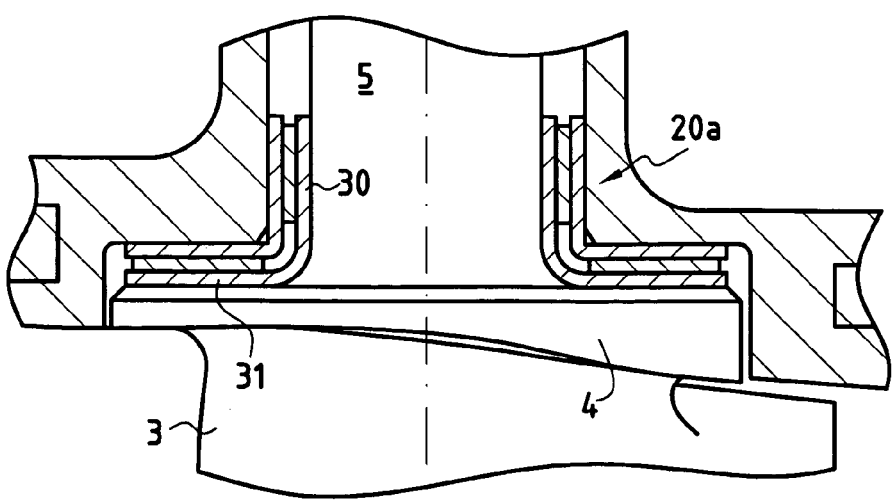
FIG. 7 is a view on a larger scale showing the bottom bearing of FIG. 5.

FIGS. 5 to 7 show a second embodiment of a smooth bearing 20 for a pivot 5, the bearing presenting a bottom bearing 20a and a top bearing 20b both made out of bushings 10 like the bushings 10 shown in FIG. 2.

These two bushings 10 take up forces better and limit tilting to a great extent because of the very good anti-wear behavior of the bottom bearing 20a and of the top bearing 20b.

What is claimed is:

1. A compressor of a turbomachine having an outer casing and at least one set of variable-pitch stator vanes with pitch-control pivots passing through orifices formed through said casing and with ceramic-based bushings forming smooth bearings being interposed, wherein such a bushing includes a metal jacket and a ceramic ring secured by brazing to an inside wall of said jacket such that said metal jacket and said ceramic ring are held together in place relative to each other by a layer of brazing between said metal jacket and said ceramic ring.

2. A compressor according to claim 1, wherein the pivot further comprises an insert ring constituted by a metallic material based on nickel, iron, or cobalt, and shrink-fitted onto said pivot.

3. A compressor according to claim 2, wherein the insert ring further comprises a collar on a plate of the vane.

4. A compressor according to claim 1, wherein the layer of brazing covers an entire outside surface of said ceramic ring.

5. A compressor according to claim 1, wherein said ceramic ring includes a plurality of pieces that are each secured to the inside of the wall such that each of said pieces is held in place in relation to said metal jacket.

* * * * *